United States Patent
Dickerson et al.

(10) Patent No.: US 7,835,331 B2
(45) Date of Patent: Nov. 16, 2010

(54) VIDEO NODE FOR WIRELESS MESH NETWORK

(75) Inventors: James W. Dickerson, Plano, TX (US); Mark C Cromwell, Plano, TX (US); Dennis K Smith, Plano, TX (US)

(73) Assignee: AgileMesh, Inc., Richardson, TX (US)

( * ) Notice: Subject to any disclaimer, the term of this patent is extended or adjusted under 35 U.S.C. 154(b) by 687 days.

(21) Appl. No.: 11/307,410

(22) Filed: Feb. 6, 2006

(65) Prior Publication Data

US 2006/0176834 A1 Aug. 10, 2006

Related U.S. Application Data

(60) Provisional application No. 60/650,112, filed on Feb. 7, 2005, provisional application No. 60/650,113, filed on Feb. 7, 2005, provisional application No. 60/650,114, filed on Feb. 7, 2005, provisional application No. 60/650,110, filed on Feb. 7, 2005.

(51) Int. Cl.
*H04W 4/00* (2009.01)
*H04N 7/18* (2006.01)
*G06F 11/00* (2006.01)
*G01S 7/40* (2006.01)
*F41A 33/00* (2006.01)

(52) U.S. Cl. .................. 370/338; 348/143; 714/33; 434/4; 434/11

(58) Field of Classification Search .............. 348/143; 714/33; 434/4, 11; 370/338
See application file for complete search history.

(56) References Cited

U.S. PATENT DOCUMENTS

| 4,777,526 A | 10/1988 | Saitoh et al. |
| 4,918,473 A | 4/1990 | Blackshear |
| 5,515,509 A | 5/1996 | Rom |
| 6,636,256 B1 | 10/2003 | Passman et al. |
| 2004/0135819 A1 * | 7/2004 | Maa .................. 345/840 |
| 2004/0142699 A1 | 7/2004 | Jollota et al. |
| 2006/0005077 A1 * | 1/2006 | Miller .................. 714/33 |

OTHER PUBLICATIONS

PCT/US2006/04109, Search Report and Written Opinion of International Searching Authority mailed Jul. 8, 2008.

* cited by examiner

*Primary Examiner*—Marivelisse Santiago-Cordero
(74) *Attorney, Agent, or Firm*—Baker & McKenzie LLP

(57) ABSTRACT

Provided are mesh video nodes for wireless mesh networks and methods thereof. A mesh video node includes a wireless interface unit, a multimedia processing unit, an input/output unit, and a control panel interface unit. The mesh video node is configured via a user interface with a communications channel selector and a node selector, where each channel is associated with a predetermined frequency channel, and each node is associated with an internet protocol address. A method of deployment is also provided via a user interface that visually represents link qualities between neighboring nodes.

14 Claims, 8 Drawing Sheets

400

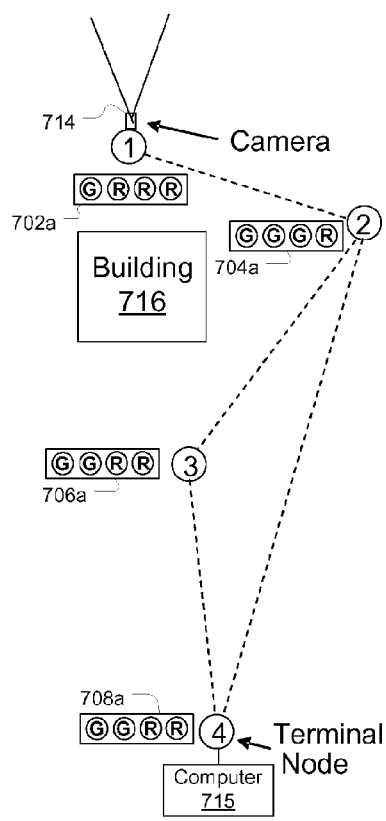
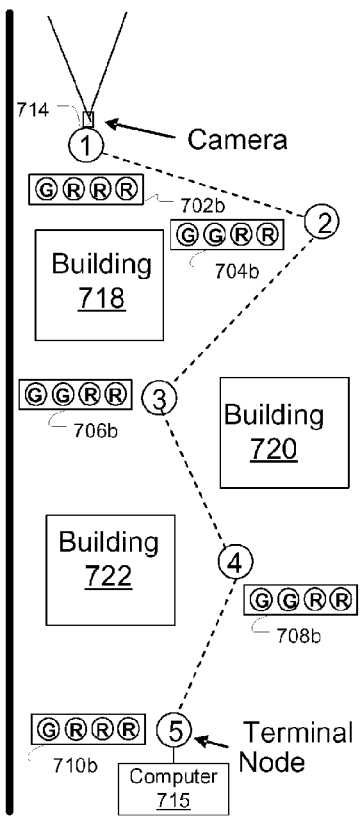
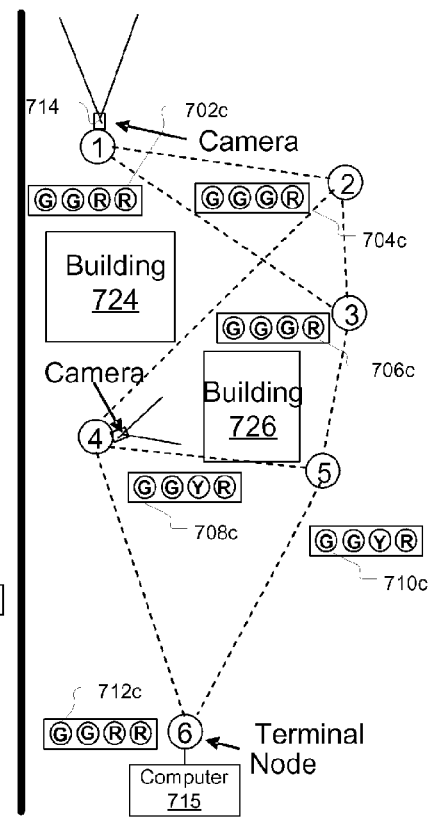
Fig. 7A     Fig. 7B     Fig. 7C

VIDEO NODE FOR WIRELESS MESH NETWORK

CROSS REFERENCE TO RELATED APPLICATIONS

This Application claims the benefit of U.S. Provisional Application Ser. Nos. 60/650,112, filed on Feb. 7, 2005, and entitled "Wireless digital video network node," 60/650,113, filed on Feb. 7, 2005, and entitled "Addressing mechanism for interconnecting network devices across a mesh network to the internet," 60/650,114, filed on Feb. 7, 2005, and entitled "Wireless digital video node user interface," and 60/650,110, filed on Feb. 7, 2005, entitled "Built-in deployment tools," which are commonly assigned with the present application and incorporated herein by reference.

BACKGROUND OF THE INVENTION

1. Technical Field

Disclosed embodiments relate generally to wireless networking, and more specifically relate to communicating multimedia data over wireless mesh networks.

2. Description of Related Art

Mesh networks are known to be used in a wide variety of applications. For instance, mesh networks have been known to be used for construction, healthcare, higher education, networked communities, public safety, security and surveillance, warehousing and wireless service delivery.

As is known, mesh networking is a way to route data, voice and instructions between nodes. It allows for continuous connections and reconfiguration around blocked paths by "hopping" from node to node until a connection can be established. Mesh networks are self-healing: the network can still operate even when a node breaks down or a connection goes bad. As a result, a very reliable network is formed which allows peer network nodes to supply back haul services to other nodes in the same network.

Nodes may be connected to peripheral devices such as video equipment for video surveillance purposes. A known implementation involves connecting a separate wireless mesh node device to a separate video server device which is in turn connected to a surveillance camera. Such a combination of separate components do not serve the purpose of video surveillance very well due to the requirement for the user to interconnect and configure each of the components separately. For example, configuration and interconnection generally requires substantial specialized networking knowledge on the part of the user. In addition, each of the network components generally have external power applied. Such configurations often occupy considerable space which does not lend itself well to surveillance operations.

Additionally, a surveillance operation of a public event may involve network nodes that are located in places where access can be a problem. An example is a surveillance camera mounted on a tall pole or on a building that may be a significant height off the ground. Fielding such a wireless video surveillance network requires various interconnections, cabling, power supplies, and configuration of a number of parameters, and network configurations between devices. Setting up is time consuming and laborious, not to mention inconvenient, to configure devices to provide a wireless mesh video network. In the case of a deployment based on an IEEE 802.11 network, these include configuring the channel number (typically, the selection of the center frequency on which the device will communicate), the internet protocol address of the video server(s), and in some instances, the encryption key. For several of these parameters, each node of the network needs to be communicated with and configured individually. In addition, it is not unusual for an address or encryption code to be incorrectly assigned, thus rendering a node completely inaccessible from the network. Correction of these types of errors are often difficult and laborious. Additionally, many potential users of a wireless video mesh network may not have a strong understanding of digital wireless networks necessary for their set up and maintenance.

In setting up the video nodes, many peripheral devices (for example, IP video cameras and video servers) require that a user log on to the device and assign an IP address. Determining what address to assign each device is often not easy and generally requires that the user have a strong understanding of networking concepts. While peripheral devices do sometimes have the capability of requesting and receiving a network address automatically, determination of just what IP address was assigned is often difficult.

Another issue when deploying a mesh network involves optimal positioning of each node. This can be a time consuming task and usually requires special tools such as a location analyzer. Such tools are costly and require RF and network knowledge to operate.

Therefore, a need exists for a video node for wireless mesh networks that simplify the operation and deployment of nodes in the network.

BRIEF SUMMARY OF THE INVENTION

Described herein are video nodes for wireless mesh networks, wireless mesh networks using video nodes, apparatus and methods that substantially meet these needs and others.

In an embodiment, the video node includes a wireless interface device that services communications in a wireless mesh data network between a multimedia source and at least one other node. The wireless interface device includes a wireless interface unit that wirelessly interfaces with the at least one other node. The wireless interface device also includes a multimedia processing unit operably coupled to the wireless interface unit, an input/output unit operably coupled to the multimedia processing unit and to the multimedia source, and a control panel interface unit operably coupled to the wireless interface unit.

A method is also provided for deploying a wireless interface device that services communications in a wireless mesh data network between a multimedia source and at least one other node. The method involves establishing a communications link between the wireless interface device and the at least one other node, determining a link quality of the communications link, and outputting the link quality on a display operably coupled to the wireless interface device.

Also provided is a user interface for a wireless mesh data network video node. The user interface includes a communications channel selector and a node selector. The communications channel selector is for selecting a communications channel that is associated with predetermined parameters, and the node selector is for selecting a node identifier that defines an internet protocol address for the node and peripheral network devices attached to the node.

BRIEF DESCRIPTION OF DRAWINGS

FIGS. 7A-7F are schematic block diagrams illustrating deployment scenarios in accordance with the present invention.

DETAILED DESCRIPTION OF INVENTION

Figure 1:
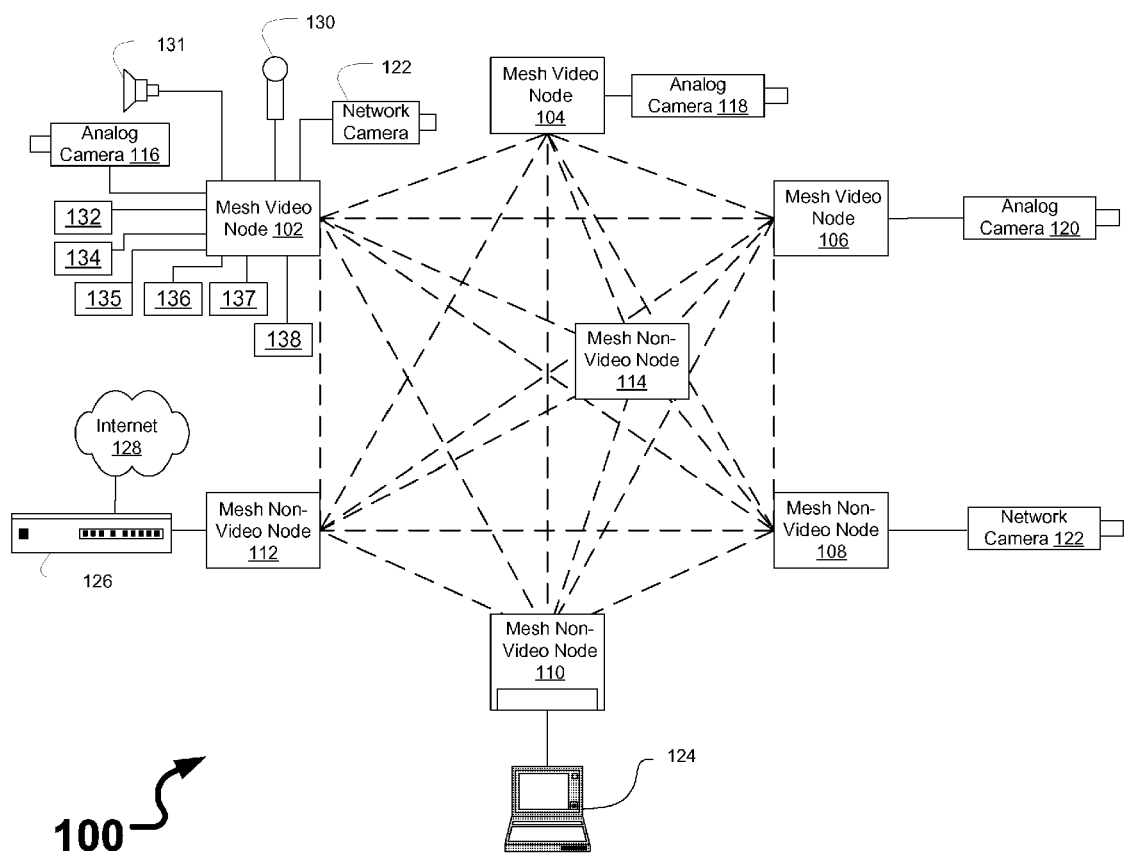
FIG. 1 is a schematic block diagram of a communications network that is in accordance with the present invention.

FIG. 1 is a schematic block diagram illustrating a communications network 100 that includes a plurality of wireless mesh nodes 102-114 and a network hardware component 126. Wireless mesh nodes 102-114 include wireless multimedia nodes 102-106 and wireless non-video nodes 108-114.

Surveillance devices may be coupled to wireless mesh nodes 102-108, and may include analog video cameras 116-120 (coupled via a video cable), network video camera 122 (coupled via an Ethernet link), microphone 130, speaker 131, gas detector 132, biohazard detector 134, radiation detector 135, break-glass detector 136, panic alarm button 137, keypad 138, motion detectors (not shown), open door detectors (not shown), et cetera. Other devices may be coupled to wireless mesh non-video nodes 110-114 such as laptop computer 124 or other computers and other network devices (not shown). Laptop computer 124 may be used as to manage multimedia inputs and outputs in the communications network 100, for example, to monitor and control video from cameras, and inputs and outputs from devices 130-138. Wireless multimedia nodes 102-106 provide a video server functionality (i.e., the capability to accept an analog video input and convert it to a digital form suitable for transport over communications network 100. The wireless multimedia nodes 102-106 will be described in greater detail with reference to FIG. 3.

The wireless multimedia nodes 102-106 and wireless non-video nodes 108-114 are operably coupled to the network hardware 126 via wireless mesh network connections between the nodes. The network hardware 126, which may be a router, switch, bridge, modem, system controller, et cetera provides a wide area network connection 128 for the communications network 100. Each of the wireless mesh nodes 102-114 has an associated antenna or antenna array to communicate with the wireless mesh nodes in its area.

Typically, messages sent within data packets traverse a wireless mesh network by hopping from one wireless mesh node to another wireless mesh node until the data packets reach their destination. Usually these data packets jump between adjacent nodes, called neighbors e.g., neighboring nodes 102 and 104, nodes 108 and 110, et cetera. Generally, wireless mesh network topologies provide for a generous number of interconnections among neighboring nodes throughout the network 100. FIG. 1 depicts a fully connected mesh network, although this is not necessary for operation.

Each node in the wireless mesh computes a source tree (or routing table) that defines the paths to all neighboring nodes within its reach. These neighbors communicate with one another efficiently using special messages that propagate the mesh network. Changes in the mesh are reported regularly to make the end-to-end configuration dynamic.

Link metrics may be used to maximize performance as traffic moves edge-to-edge through the wireless mesh. These metrics can be based on measuring signal strength, stability, transfer rate, bit error rate, latency, number of hops, or other 'per link' parameters. Each link therefore carries a 'cost' and the overall load can be balanced efficiently by whatever path presents the least cost.

The communications between wireless mesh nodes 102-114 may have self-management, self-configuring, self-tuning, self-healing and self-monitoring capabilities. A management console (e.g., running on laptop 124) may be used to provide a visualization of actual interconnections between nodes 102-114, and may also provide a means to monitor the communication network's 100 status from edge-to-edge, and provide performance and activity statistics. The console may also provide some form of command and control over the communications network 100, including wireless mesh node updates, software upgrades, and reconfigurations.

Security is a major concern for mesh networks. Traffic within communications network 100 preferably should be secured and outside devices, including video sources and those that use the mesh's Ethernet services, should be prohibited from accessing internal mesh traffic. Features like digital signatures can be used to ensure that only authorized systems participate in the mesh. User traffic between nodes can also be encrypted to prevent wireless eavesdropping, for instance, by using 128-bit and 256-bit AES encryption, WEP, or the like. The communications network 100 may also support other security standards available on other Ethernet-based and wireless networks. Compatibility with any end-to-end security provisions, such as virtual private networks (VPNs), may also be implemented for securing over-the-air communications between network devices.

It is noteworthy that a wireless mesh node is not a wireless access point. The very nature of communications within the mesh is very different from that which occurs between access points and client/server systems. The IEEE 802.11 standards body recognized this difference by providing two separate modes of communication: Ad-hoc and Infrastructure. Although there have been some attempts to integrate mesh nodes with access points on a common platform, and sharing components, such as the chassis, powers supply, and radio/antenna, to reduce costs. In essence, the wireless mesh network provides a backbone network, and is preferably separate from an access network. Nevertheless, access point devices may be coupled to mesh nodes at the edge of the network.

Network addresses may be assigned to network devices attached to a wireless mesh node in one of two ways. In a first technique, the network address can be assigned manually to the network device. If it is done manually, it must be unique among network devices attached to that mesh node and it must fall within the range of legal private network addresses defined for that mesh node. Typically, each mesh node will use the same range of private network addresses, so once that device is configured with a particular address, it will likely be usable on any of the other nodes in the mesh network. Alternatively, in a second technique, the network address may be assigned automatically to the device. The network address will once more fall in the range of legal private network addresses defined for that particular node. The automatic assignment may be accomplished through a sequence of transactions between the network device and the software running on the mesh node. A mechanism that may be used is the standard DHCP (Dynamic Host Configuration Protocol)

commonly used in IP-based Local Area Networks. Whether assigned manually or automatically, the address may be a class C private network address (for example, 192.168.012.001) that is unique among the devices attached to that particular wireless mesh node.

The mesh nodes in the network will each have a unique address. Once more, it will be a private network address. The addresses may be class C addresses (255 potential members), class B addresses (65534 potential members) or class A addresses (up to 16,777,216 members). In an embodiment, the network addresses actually assigned to wireless mesh nodes would each be even multiples. For example, if the class B private network address range is used, and the multiple was four, the addresses of the first four mesh nodes on the network could be 172.016.000.004 for a first node, 172.016.000.008 for a second node, 172.016.000.012 for a third node, and 172.016.000.016 for a fourth node, et cetera. The unassigned addresses between the node addresses may be reserved for destination network translation addresses for the peripheral devices attached to each node. For example, a single network device attached to a third node with a private network address of 192.168.0.1 would be addressed from elsewhere in the mesh network with an address of 172.016.000.013 (i.e., 012+1). The third wireless mesh node would, using its network address translation function, translate the destination address from 172.016.000.013 to 192.168.0.1 before passing the message along. Likewise, the destination address of a message originating at the network device subtending the third wireless mesh node would be translated into the correct 172.016.000.xxx address associated with the device for which the message was intended and the source address field would be translated into 172.016.000.013 to reflect the source address as viewed from within the mesh network. The net result of using this scheme is that every network device in the mesh network and every subtending network device attached to the mesh nodes will have a unique private network address associated with it. All of the devices can be addressed from within the network by the appropriate 172.016.xxx.xxx address (using the example shown above).

Additionally, the wireless network node may make provision for connection of the mesh network to the Internet using a network device 126, such as a router. Routers typically include a Network Address Translation function that allows that router to have a single public network address while providing internet accessibility to the network devices connected to the other side of the router. This may be accomplished with messages passing between the Internet and the LAN network devices by translating source and destination addresses associated with the LAN network devices into the single public network address assigned to the router and embedding a port number into the message to distinguish which of the LAN devices is the source or destination.

Figure 2:
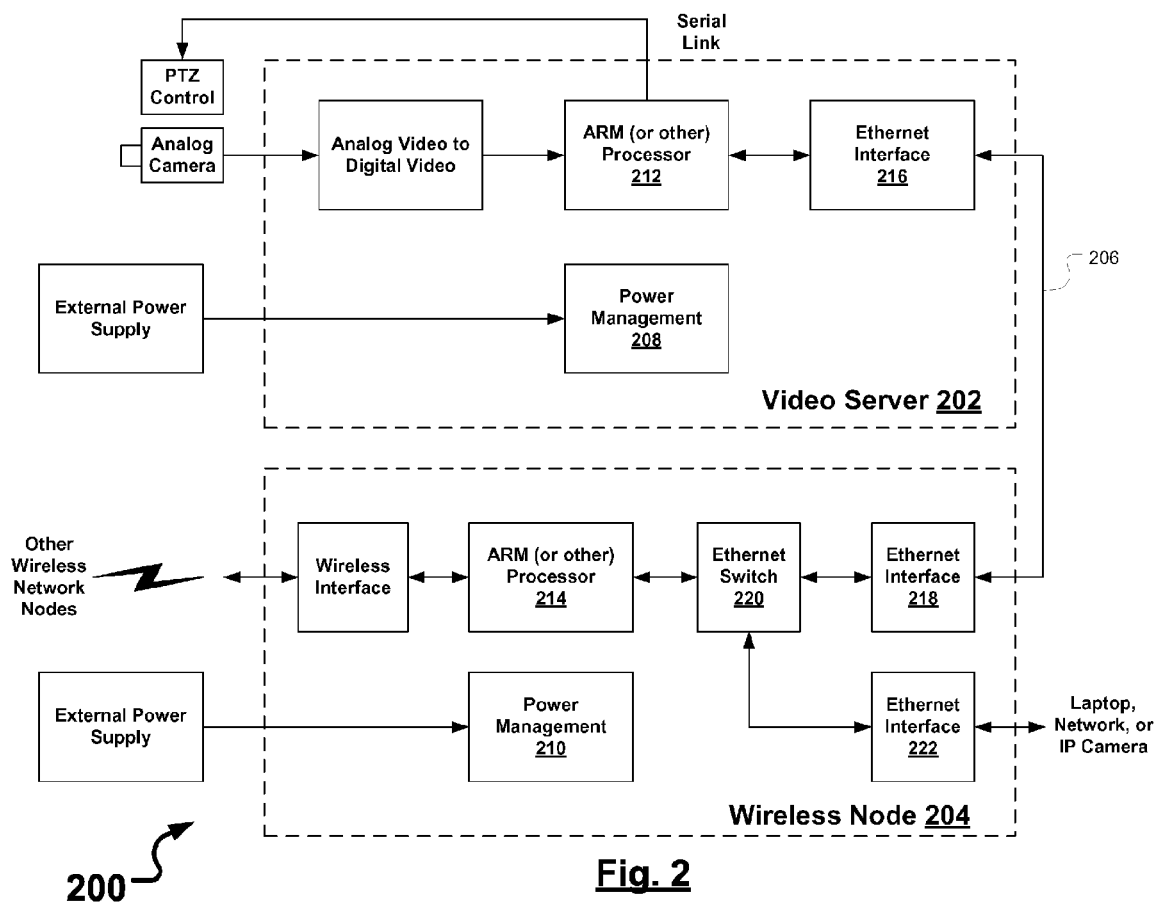
FIG. 2 is a video node system that does not incorporate the teachings of the present invention.

FIG. 2 is a known video node system 200 that does not incorporate the teachings of the present invention. Video node system 200 includes a network video server 202 coupled to wireless network node 204 via an Ethernet link 206.

Figure 3:
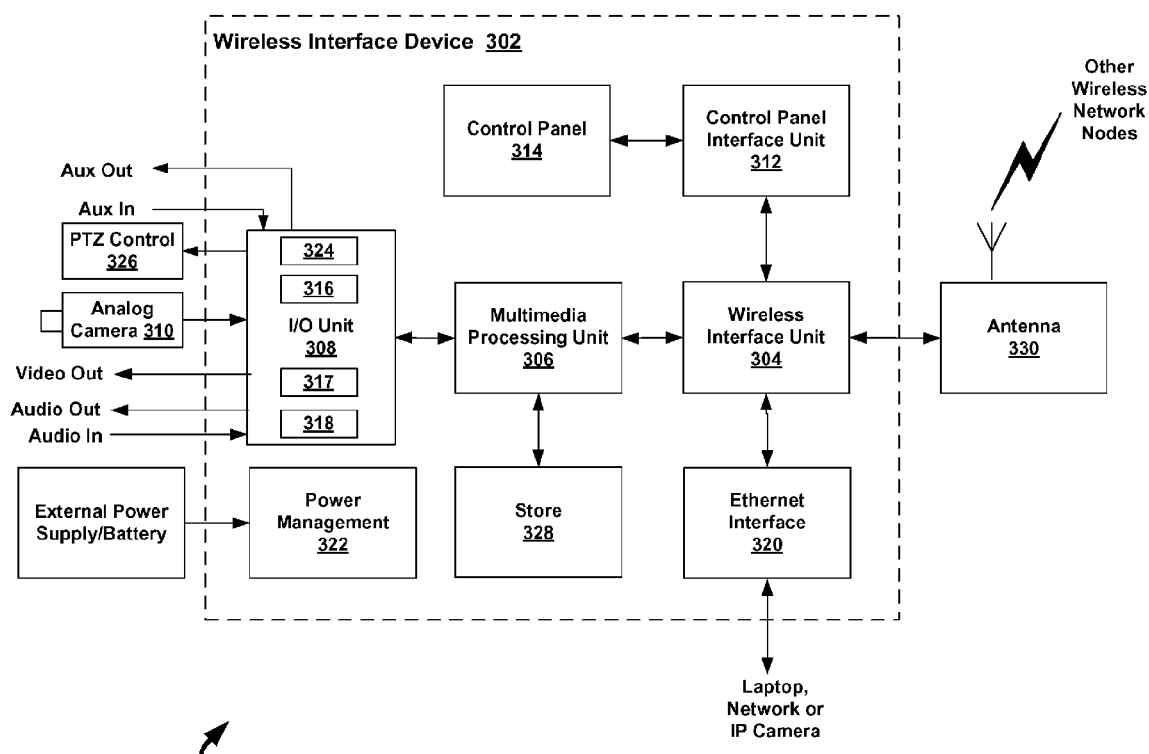
FIG. 3 is a schematic block diagram of a wireless multimedia node in accordance with the present invention.

Such an implementation of known video node system 200 has the following disadvantages, as well as others, relative to the video network node of the present disclosure which are described in further detail in FIG. 3. First, video node system 200 requires the user to interact with each of the network video server 202 and wireless network node 204 separately, even if they are packaged into the same box. Second, there is the added complexity of interconnection between these modules. Third, there would be a number of components duplicated between the two modules (e.g. the Power Management modules 208-210, the ARM (or other) processors 212 & 214, multiple Ethernet interfaces 216-218). Fourth, the Ethernet switch component 220 is necessary to allow both the interconnects (over Ethernet link 206) and the external Ethernet interface 222. Fifth, the end result is more bulky than the integrated design. Sixth, because of the larger number of components, the redundant parts and the packaging, the cost of this approach is substantially higher than that of the integrated design. Seventh, the larger number of components and the increased number of interconnects between devices increase the probability of a failure of a key component. Thus, the conventional approach offers less reliability than the integrated approach. Additionally, with such a system 200, there is typically no provision in this approach for audio input, audio output, or any other peripheral devices (e.g., gas, biohazard, radiation detectors, et cetera).

FIG. 3 is a schematic block diagram illustrating a wireless multimedia node 300 that includes a wireless interface device 302 for servicing communications in a wireless mesh data network between a multimedia source (e.g., camera 310) and at least one other node (not shown). Generally, the wireless multimedia node 300 includes a wireless interface unit 304, a multimedia processing unit 306, an input/output unit 308, a multimedia source 310, and a control panel interface unit 312. In this embodiment, the wireless interface unit 304 wirelessly interfaces with at least another node, a multimedia processing unit 306 is operably coupled to the wireless interface unit 304, an input/output unit 308 is operably coupled to the multimedia processing unit 306 and to the multimedia source 310, and a control panel interface unit 312 is operably coupled to the wireless interface unit 304.

The control panel interface unit 312 may be operable to receive a channel selection input and a node selection input from a control panel 314 that is operably coupled to the control panel interface unit 312. The control panel 314 may include a channel selector and a node selector. The control panel 314 may further include a deployment display that provides a representation of received signal strength between the wireless interface device and the at least one other node. An exemplary control panel and deployment displays are described in more detail with reference to FIGS. 4 and 4A-4C respectively.

Input/output unit 308 may include analog video interface 316, auxiliary bus controller 317, audio interface 318, and camera orientation controller 324. Analog video interface 316 may take in an analog video signal and convert it to a digital format, as well as receive a digital signal and convert it to an analog video output. Auxiliary bus controller 317, via the aux in and aux out ports, may receive and transmit signals to and from auxiliary devices shown in FIG. 1, such as gas detector 132, biohazard detector 134, radiation detector 135, breakglass detector 136, panic alarm button 137, keypad 138, as well as others. I/O unit 308 may also include a serial interface controller to provide a Universal Serial Bus (USB) port and an RS232 port for connection of various peripheral devices. The audio interface 318 may make provision for audio input and output at the wireless multimedia node 300 by accepting an audio input through an external connector, converting it to a digital format and encoding the audio input for transport through the communications network 100. The audio output performs the opposite function. That is, it accepts an outbound digital audio stream, decodes it and converts the signal back to an audio output. The wireless interface device 302 may further include a camera orientation controller 324 operably coupled to the wireless interface device 304, which interfaces with actuating hardware 326 to control the pitch, tilt and zoom of a camera.

Multimedia processing unit 306 is operable to process multimedia information from several devices, which may include for example, an analog video camera, an infrared camera and a microphone. Multimedia processing unit 306 may take the digital output of the Analog Video to Digital Video Converter 316 and encode it into a series of digital video frames suitable for transport over an Ethernet or Internet Protocol (IP) network. Multimedia processing unit 306 may perform digital signal processing, compression, and enhancement algorithms on video and audio signals passing therethrough.

An Ethernet interface unit 320 may be operably coupled to the wireless interface unit to provide connectivity to Ethernet-enabled devices such as a computer, or a local area network or IP camera. Ethernet interface unit 320 provides an external physical Ethernet interface as well as the Media Access Control (MAC) and Physical layer (PHY) functions for the module. The Ethernet interface unit provides true Ethernet connectivity and is fully compatible and interoperable with all Ethernet switching and routing protocols (including IPv6, VPN tunnels, VLANs, OSPF, BGP, RIP, Multicast, MPLS, et cetera). Information such as voice data or video may be transferred at different user-selectable priority levels depending on the nature of the traffic. To ensure interoperability, any proprietary mesh traffic and routing between modes should be transparent to any Ethernet devices connected to the mesh network. Typically, the mesh node employs the Internet Protocol (IP) internally within the mesh, it may operate externally as a virtual Ethernet switch, therefore allowing support for any non-IP protocol in virtually any application, including Appletalk, IPX, NetBios/BEUI, SNA, et cetera. Additionally, devices coupled to the Ethernet interface unit 320 may be powered using power-over-Ethernet enabled devices in accordance with IEEE 802.3af standards, which are herein incorporated by reference.

Power management unit 322 may be operably coupled to the wireless interface unit 304 to manage the power requirements for the wireless interface device 302, and in some instances, external devices connected thereto. It receives a supply voltage, regulates it to the required voltages for the module and distributes the power to the other units. Power management unit 322 may also include functions that control the charging and discharge of an external or internal battery, as well as controlling power conservation, and supplying power to power-over-Ethernet devices that are coupled via the Ethernet interface 320. In some instances, power conservation function may be performed by monitoring the performance of the various units and selectively shutting down some units depending on a predetermined state of operation.

In some instances, the multimedia processing unit may further include a store for storing multimedia information 328, such as solid state flash memory, a hard disk, or any other form of storage medium capable of storing multimedia data. Store 328 may record, for instance, video and audio information such that if the wireless interface device 302 periodically loses contact with other wireless network nodes, then upon regaining contact with the mesh network, store 328 may be accessed to review the multimedia information stored therein. Accordingly, even if the radio signal is jammed or interference temporarily prevents its communications operation in the wireless mesh, the store 328 will continue to record multimedia data for later review. The store 328 may also be configured to record multimedia data upon receiving an activation signal, for example, triggered by a motion detector, a break-glass detector, or other such triggering device.

As one of average skill in the art will appreciate, the wireless interface device 302 of FIG. 3 may be implemented using one or more integrated circuits. For example, the wireless interface unit 304 may be implemented on one integrated circuit, the multimedia processing unit 306 and input/output unit 308 may be implemented on a second integrated circuit, the control panel interface unit 312 on a third integrated circuit, and the remaining components of the wireless interface unit 302, less the antenna 330 may be implemented on a fourth integrated circuit. As an alternate example, the wireless interface device 302 may be implemented on a single integrated circuit.

Figure 4:
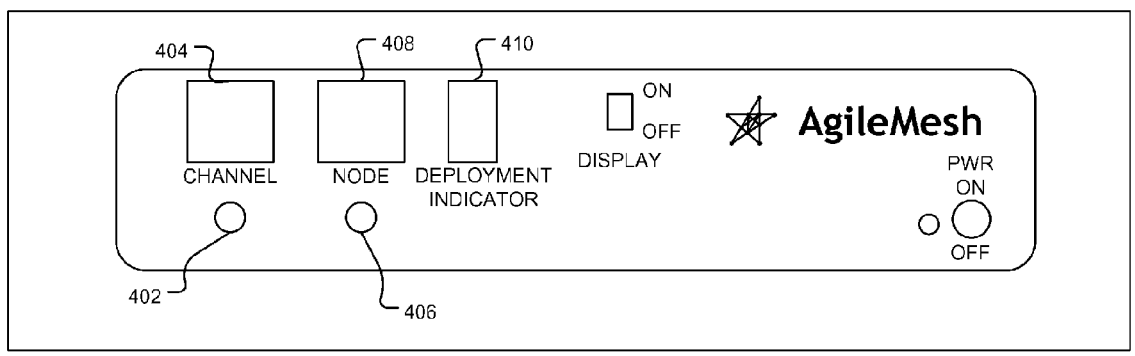
FIG. 4 is a diagram of a user interface that may be used with the wireless multimedia node in accordance with the present invention.

FIG. 4 is a diagram of a user interface 400 that may be used with the wireless multimedia node 300 of FIG. 3. Fielding a wireless video surveillance network requires configuration of a number of parameters, for example, selection of the center frequency on which the device will communicate, the Internet Protocol address, and in some instances the encryption key, of the video server(s). With the known video node system shown in FIG. 2, in setting up the network, each node of the network needs to be communicated with and the parameters configured individually. In addition, it is not unusual for an address or encryption code to be incorrectly assigned, thus rendering a node completely inaccessible from the network. Correction of these types of errors are often difficult and laborious. Since many potential users of a wireless video surveillance network (particularly in the case of a portable or temporary network setup) may not have a strong understanding of digital wireless networks, it is desirable to have a simple setup process catering for such users.

Accordingly, user interface 400 provides users with an exemplary interface that configures network parameters based on user selection of virtual "channels". User interface 400 includes a channel selector 402, a channel indicator 404, a node selector 406, a node indicator 408, and a deployment indicator 410 (described in further detail in FIG. 4A-4C). Channel selector 402 and node selector 406 may be push button, toggle, or rotatable switches that are used to select the channel and node respectively. Channel and node selection may also be performed via a remote device, e.g., RF or infrared remote control, or over the communications network via a client interface (not shown). Channel indicator 404 represents a communications "channel," and node indicator 408 represents the node address of the wireless multimedia node 300, which may be displayed on a digital display e.g., using mechanical digits, liquid crystal digits, LED, LCD/TFT panel displays, et cetera.

In selecting a channel via channel selector 402, the wireless multimedia node 300 with which the user interface 400 is associated may select a combination of a particular frequency channel and, in some instances, one of several predetermined encryption keys, and a Service Set Identifier (SSID). The node indicator 408 shows a number that is associated with a network address of the integrated video server according to a predetermined mapping. Table 1 provides an exemplary mapping of selected "channels" to map to frequencies, encryption keys, SSIDs (not shown) and network (most likely Internet Protocol) addresses. Note that other mapping schemes are possible and likely to be used for different implementations of the wireless multimedia node 300.

In the below example, communication channels map to 802.11 frequency channels, SSIDs and pre-configured encryption keys. The following list illustrates an exemplary mapping of channel numbers:

00 to 10 maps to 802.11 wireless channels 1-11, unencrypted;
    11 to 21 map to 802.11 channels 1-11, encryption key 1;
    22 to 32 map to 802.11 channels 1-11, encryption key 2;
    33 to 43 map to 802.11 channels 1-11, encryption key 3;

44 to 54 map to 802.11 channels 1-11, encryption key 4;
55 to 65 map to 802.11 channels 1-11, encryption key 5; and
66 to 99 are reserved for diagnostic use.

Node identifiers map to IP addresses. Node identifier number is an offset to be added to pre-configured base IP address. It should be noted that this exemplary mapping is shown for IEEE 802.11 b/g US product. The mapping may be different for other countries or standards.

A node identifier mapping example is shown below.
00 to 63 map to Base IP address+node identifier number; and
64 to 99 are reserved for diagnostic use The set of predetermined encryption keys and the base IP address are configurable via an embedded web-server interface that can be accessed across the network from a computer with a web browser.

With this type of user interface 400, a field user that is unfamiliar with network and wireless considerations can simply select the desired virtual communications "channel" and the node identifier to which the associated video input is assigned. Each node on the same channel should have a unique node identifier.

The same user interface 400 may be represented on a remote computer-based graphical control panel (i.e. a client, web browser, et cetera). The net result is that the rather esoteric frequency channels, encryption keys and IP addresses can be assigned automatically for the user without the necessity of understanding the technical aspects of these parameters. Consequently, the non-technical user may now find the configuration and use of the wireless multimedia node network to be much more accessible and less intimidating than was previously the case with multiple components (separate mesh node and video server). In addition, the probability of an error rendering a wireless node inaccessible is less likely and easily corrected if it does happen.

Figure 4A:
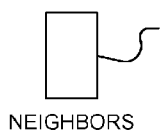
FIGS. 4A-4C is a diagram of deployment indicators may be included with the user interface of FIG. 4 in accordance with the present invention.
Figure 4B:
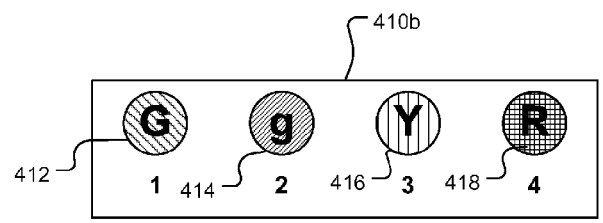
Figure 4C:
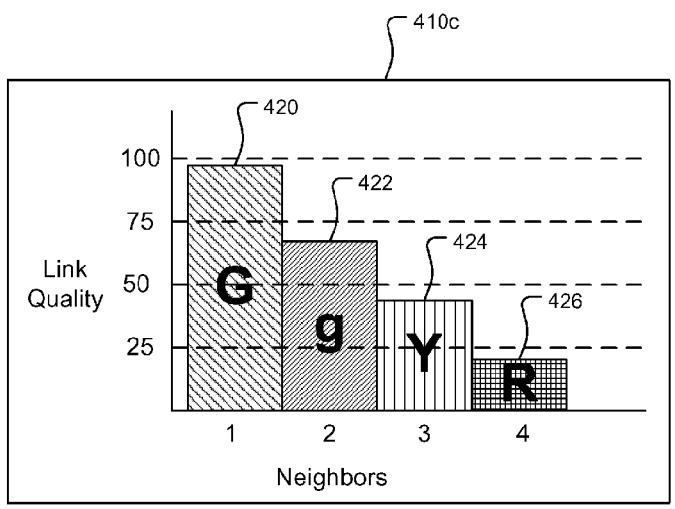

Positioning of each node in a mesh network is a time consuming task and usually requires special tools such as Location Analyzer from Motorola. Such tools are costly and require RF and network knowledge to operate. For ease of use in a video surveillance application, the ability for a non-technical user to know if the placement of a wireless node 300 is correct (or at least usable) is very important. FIGS. 4A-4C illustrate three exemplary deployment indicators 410a-410c that may be used with the user interface 400 of FIG. 4, to allow a non-technical user to determine if a node is optimally placed. In general, deployment indicators 410a-410c provide a visual representation of the neighbor table held within each Node.

FIG. 4A is a diagram of an exemplary deployment indicator 410a that may be included with the user interface 400 of FIG. 4. Deployment indicator 410a includes a digital display that represents the number of neighboring wireless nodes detected by wireless node 300, for which link metrics meet thresholds (e.g., measured signal strength, stability, transfer rate, bit error rate, latency, number of hops, and other 'per link' parameters) for satisfactory connection. Thus, the greater the number of neighbors displayed, then more interconnections are available via neighboring nodes. Multiple redundant paths add robust resiliency and, when properly arranged, eliminate single points of failure and potential bottlenecks within the mesh. Should a link become congested or a node fail the mesh automatically redirects traffic on an alternate route. Indeed, if there are two or more neighbors displayed on deployment indicators 410a, then a redundant path is available should one of the links fail. If the number of neighbors is zero, the user knows to start trouble-shooting the node location and/or configuration (channel and node number). This can save valuable time.

FIG. 4B is a diagram of an alternative deployment tool 410b that may be included with the user interface 400 of FIG. 4. Deployment tool 410b includes tri-colored light emitting diodes 412-418 to indicate the four "best" neighbors. The term "best" may be determined by the link metrics described above with reference to FIG. 4A. These link metrics are used to determine link quality. Link quality ranges from 0% to 100% can be displayed in several different ways (i.e. LEDs, video display, LCD display, etc). For example, in deployment tool 410b, LED 412 illustrates the best link quality and has a fully green LED representing 75% to 100% link quality. LED 414 illustrates the second best link quality and represents at least 50% to 74% link quality, as indicated by a light green color. LED 416 illustrates link quality of at least 25% to 49%, as represented by a yellow color, and LED 418 illustrates a link quality of 24% or less with a red color. It is possible to have all four LEDs 412-418 with a link quality of 100% or all with a link quality of 0%. The link quality thresholds do not have to be at 25%, 50% and 75% levels and may be somewhere in between, as may be represented by various shades or other colors.

FIG. 4C is a diagram of an alternative deployment tool 410c that may be included with the user interface 400 of FIG. 4. Deployment tool 410c may be provided on a visual display to show the link quality of neighboring nodes. In this exemplary display, first, second, third and fourth neighbor indicators 420-426 provide a bar graph of link quality for the four neighboring nodes with the best link quality. Color coding may be used to represent link quality ranges, similar to those used above with reference to FIG. 4B.

Figure 5:
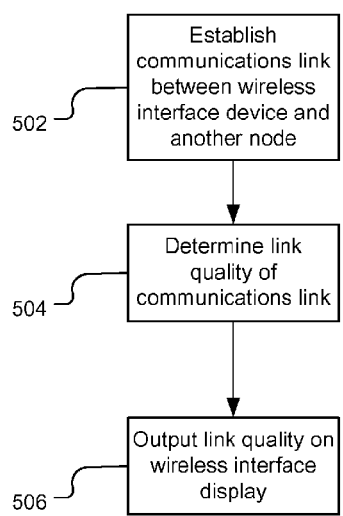
FIG. 5 is a logic diagram of an exemplary method for deploying a wireless multimedia node in accordance with the present invention.

FIG. 5 is a logic diagram of an exemplary method for deploying a wireless interface device that services communications in a wireless mesh data network between a multimedia source and at least one other node. Generally, the method includes establishing a communications link in the wireless mesh data network between the wireless interface device and the at least one other node, at step 502. A link quality of the communications link is determined at step 504. The link quality is then output on a display operably coupled to the wireless interface device, at step 506. The step of determining the link quality may include measuring signal strength, stability, transfer rate, number of hops, bit error rate, and latency.

In some instances, the method may further include determining whether the link quality of the communications link satisfies a threshold. In doing so, the method may further involve counting a number of communications links satisfying the threshold and displaying the number of communications links satisfying the threshold. In another instance, the method may involve outputting the link quality on a display located on the wireless interface device. In yet another instance, the method may include outputting the link quality on a display located remotely from the wireless interface device.

The method may also include displaying the link quality for a first communications link, whereby the first communications link has the first highest determined link quality between the wireless interface device and the at least one other node. Furthermore, the method may also include displaying the link quality for a second communications link, whereby the second communications link has the second highest determined link quality between the wireless interface device and the at least one other node.

Figure 6:
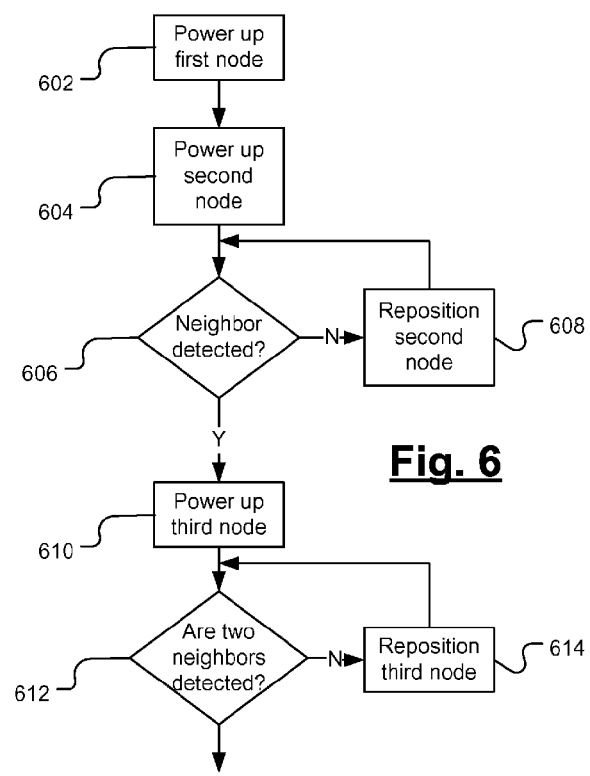
FIG. 6 is a logic diagram of an exemplary method for deploying wireless multimedia node in accordance with the present invention.

FIG. 6 is a logic diagram of an exemplary method for deploying wireless multimedia nodes. A first node is powered up, at step 602. Then a second node is powered up, at step 604. A determination is made whether the first node is detected by the second node, at step 606. If so, then a third node is powered up at step 610; if not, then the second node is repositioned until the first node is visible, at step 608. After powering up the third node, a determination is made whether any of the neighboring nodes are detected, at step 612; if not, then the third node is repositioned until the second node is visible, at step 614. This method may continue until all nodes are placed with satisfactory communication links among the nodes.

Figure 7D:
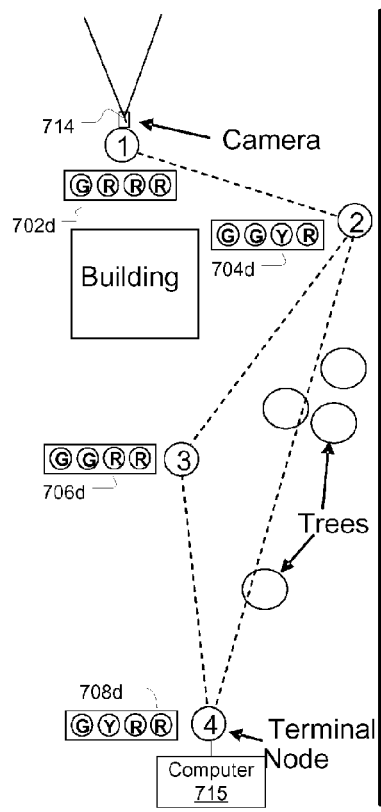

FIGS. 7A-7F are schematic block diagrams illustrating various node deployment scenarios. FIGS. 7A-7C generally show optimal deployments, and FIGS. 7D-7F generally show sub-optimal deployments. One realization of the deployment tool 410b of FIG. 4B is illustrated on each of FIGS. 7A-7F to show likely graphical representations of link qualities for the various nodes 702a-708a for FIG. 7A, nodes 702b-708b for FIG. 7B, . . . , and nodes 702f-708f for FIG. 7F. A green light (or LED) represents a very good communication path to a neighbor and the red light represents a very bad communication path to a neighbor. A yellow light represents a marginal communication path to a neighbor. There could be many more neighbors, but the "best" four are all that may be needed. Although four neighbors are used here as an example, this could be implemented with other numbers, e.g., two indicators may be used to show the "best" two neighbors. Although not shown here, in other embodiments, direction indicators may also be used to show the direction of each neighboring node.

With reference to FIG. 7A, camera 714 is operably coupled to first node 702a, and a viewing station 715 (i.e., laptop computer, et cetera) may be operably coupled to fourth node 708a. Deployment tool 410b for the first node 702a shows one green light and three red lights, indicating a single link with a neighboring node with a very good communication link to the neighbor. Deployment tool 410b for the second node 704a shows three green and one red light, therefore illustrating three very good communication paths to three neighboring nodes. Deployment tool 410b for the third node 706a shows two green and two red lights, showing two very good communication paths to neighboring nodes. Similarly, deployment tool 410b for the fourth node 708a shows two green and two red lights, showing two very good communication paths to neighboring nodes. In this scenario, building 716 provides an obstruction between first node 702a and third node 706a so the packets from the third node 706a or fourth node 708a are relayed via second node 704a.

Now referring to FIG. 7B, which illustrates a scenario where obstructions (i.e., buildings 718-722) prevent redundant paths between nodes from being established. Such a placement of nodes still operates, but if one node fails, then the communication path also fails.

FIG. 7C shows a scenario of node configuration around buildings 724-726 to provide viewing station 715 with video from camera 714. As illustrated, the link quality between nodes 708c and 710c is an exception to optimum routing as indicated by the yellow light.

Figure 7E:
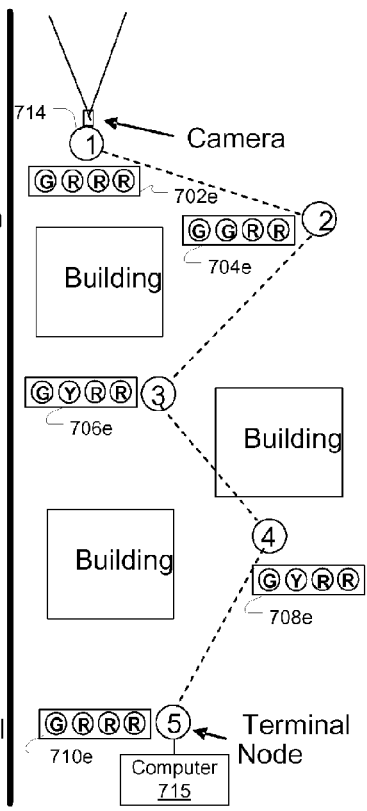
Figure 7F:
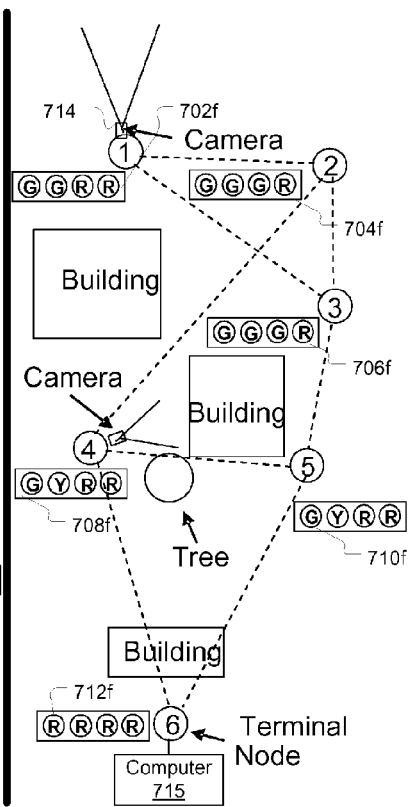

FIGS. 7D-7F show node deployment scenarios that are less than optimal. A yellow link represents a marginal link and may be improved if possible. There is nothing wrong with a marginal link if that is the only position possible.

FIG. 7D shows an attenuated link between nodes 704d and 708d due to trees in the path. The yellow light indicates that one of the links communicating to node 708d is a marginal link (the link from node 704d). Node 704d indicates that one of three links is marginal.

FIG. 7E shows a poor link between nodes 706e and 708e due to a non-line of sight path between the nodes. Node 706e or Node 708e may be moved to improve the link quality.

FIG. 7F depicts node 712f with a loss of communication among any other nodes (due to the building) as well as a marginal link between nodes 708f and 710f. Thus, the link quality between nodes 708f and 712f may be improved by repositioning and/or addition of intermediate nodes.

As one of ordinary skill in the art will appreciate, the term "operably coupled", as may be used herein, includes direct coupling and indirect coupling via another component, element, circuit, unit, or module where, for indirect coupling, the intervening component, element, circuit, unit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

Having described several embodiments, it will be recognized by those of ordinary skill in the art that various modifications, alternative constructions, and equivalents may be used without departing from the spirit of the disclosed embodiments. Accordingly, the presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background of the Invention" is not to be construed as an admission that technology is prior art to any invention(s) in this disclosure. Neither is the "Brief Summary of the Invention" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A user interface for a wireless mesh data network video node comprising:
    a physical communications channel selection switch for assigning a communications channel to the wireless mesh data network video node, wherein the communications channel is associated with a predetermined parameter; and
    a physical node selection switch for assigning a node identifier to the wireless mesh data network video node, wherein the node identifier is associated with an internet protocol address.

2. The user interface of claim 1, wherein the predetermined parameter comprises at least one of a channel number, an encryption key, and a Service Set Identifier (SSID).

3. The user interface of claim 2 further comprising a look up table for storing at least one of a predetermined frequency channel, SSID, and the predetermined encryption key associated with each communications channel.

4. The user interface of claim 3 wherein the predetermined frequency channel and the predetermined encryption key associated with each communications channel stored in the look up table is configurable over a network connection.

5. The user interface of claim 1 wherein the physical communications channel selection switch comprises one of a push button, toggle and a rotatable switch.

6. The user interface of claim 1 wherein the predetermined parameter comprises a channel number associated with an IEEE 802.11 standard frequency.

7. The user interface of claim 1 further comprising a display for representing a communications channel selection and a node identification selection.

8. A user interface for a wireless mesh data network video node comprising:
   a physical communications channel selection switch for assigning a communications channel to the wireless mesh data network video node, wherein the communications channel is associated with a predetermined parameter; and
   a physical communication node selection switch for assigning a communication node identifier to the wireless mesh data network video node, wherein the communication node identifier is associated with an internet protocol address representing a point of connection in a wireless network.

9. The user interface of claim 8, wherein the predetermined parameter comprises at least one of a channel number, an encryption key, and a Service Set Identifier (SSID).

10. The user interface of claim 9 further comprising a look up table for storing at least one of a predetermined frequency channel, SSID, and the predetermined encryption key associated with each communications channel.

11. The user interface of claim 10 wherein the predetermined frequency channel and the predetermined encryption key associated with each communications channel stored in the look up table is configurable over a network connection.

12. The user interface of claim 8 wherein the physical communications channel selection switch comprises one of a push button, toggle and a rotatable switch.

13. The user interface of claim 8 wherein the predetermined parameter comprises a channel number associated with an IEEE 802.11 standard frequency.

14. The user interface of claim 8 further comprising a display for representing a communications channel selection and a node identification selection.

* * * * *